UNITED STATES PATENT OFFICE.

VIVIAN VANCE, OF HAVANA, NEW YORK.

IMPROVED MEDICINE FOR HORSES.

Specification forming part of Letters Patent No. 49,015, dated July 25, 1865.

*To all whom it may concern:*

Be it known that I, VIVIAN VANCE, of Havana, Schuyler county, New York, have invented and discovered a certain new, useful, and efficient Medicine or Remedy for the Colic and Botts in Horses; and I do hereby declare the following to be a full and accurate description thereof, and of the mode of compounding the same.

To prepare my medicine or remedy I take of green tea, one ounce; of ginger, one-half ounce; of yellow soap, one-half ounce; of foxglove, three drams; of water, thirty-four fluid ounces. Boil the green tea in sixteen ounces of the water down to four ounces. Boil separately the foxglove in eight ounces of water down to two ounces, and filter. Then in ten ounces of water simmer the soap and ginger, and add the first two solutions. Simmer the whole together for a few minutes and administer at about a temperture of 98° Fahrenheit.

The above prescription I have found by long experience to be an efficient remedy for the colic and the botts.

Having thus described my invention or discovery, what I claim as new, is—

The above described remedy, prepared and compounded in the manner and for the purpose substantially as described.

VIVIAN VANCE. [L. S.]

Witnesses:
  JOHN PLINE,
  A. KEYSER.